Sept. 22, 1942.  A. J. BRANSCOM  2,296,497

PAYROLL RECORD

Filed April 2, 1942  2 Sheets—Sheet 1

Fig. 1.

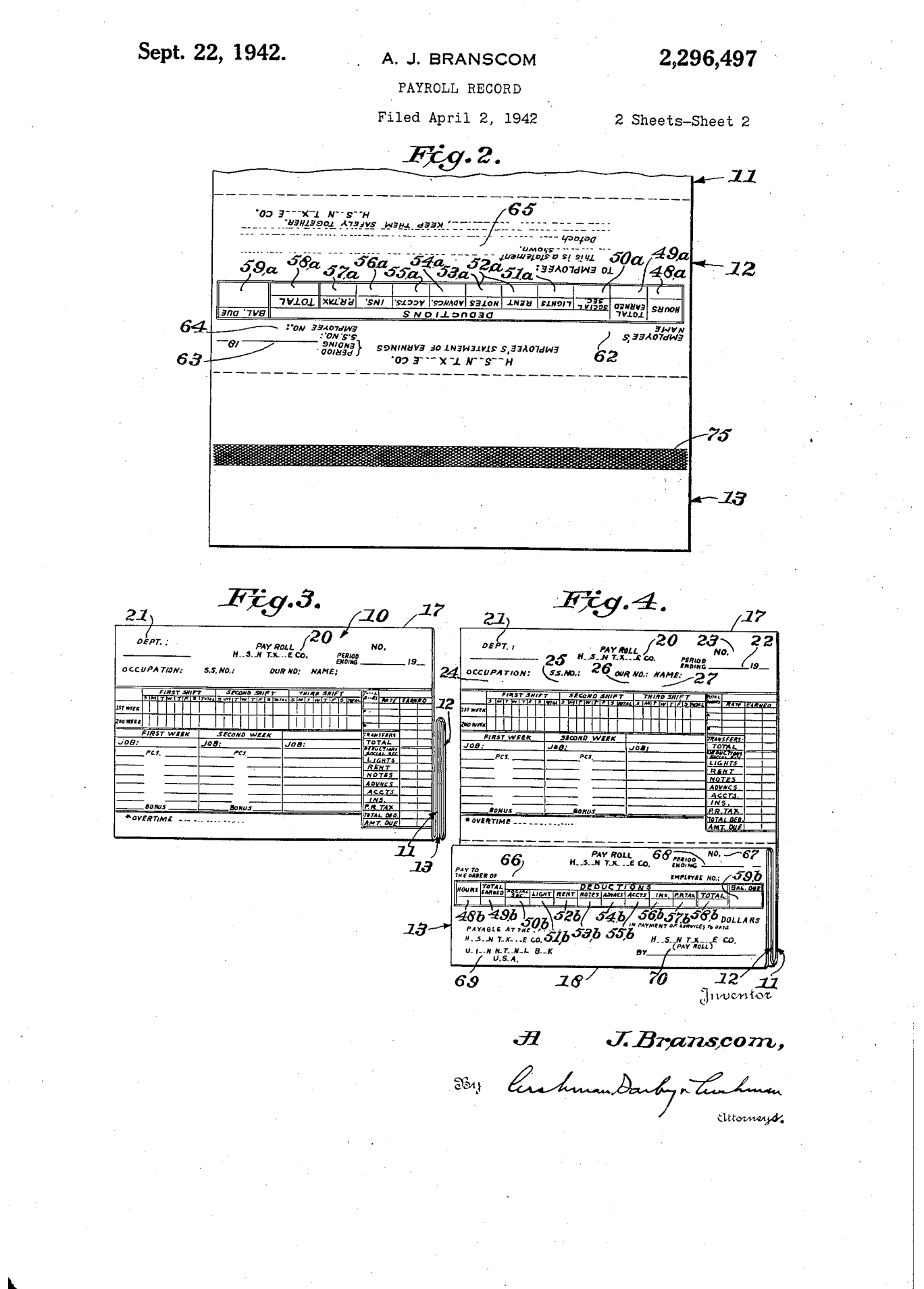

Sept. 22, 1942.   A. J. BRANSCOM   2,296,497
PAYROLL RECORD
Filed April 2, 1942   2 Sheets—Sheet 2

Patented Sept. 22, 1942

2,296,497

UNITED STATES PATENT OFFICE 2,296,497

PAY ROLL RECORD

Arthur J. Branscom, Houston, Tex.

Application April 2, 1942, Serial No. 437,426

6 Claims. (Cl. 282—12)

The present invention relates to a new article of manufacture, in the form of a paper sheet having a novel relationship of physical structure and printed matter, adapted for use in keeping employee pay roll records and tax records, and in making wage payments.

A primary object of the invention is to provide a pay roll record sheet having, in combination, novel structural characteristics and novel arrangements of printed matter thereon, so as to simplify the system of keeping time records and pay roll records.

A further object of the invention is to provide a unitary record sheet, which will not only simplify the operations of entering data thereon, but which will also eliminate, substantially entirely, the likelihood of mistake or error in making out employee pay checks.

A further object of the invention is to provide an article of this class adapted to perform a plurality of new functions, such as simultaneously and in a uniform manner, creating a record of the work done by an employee and the compensation due him, and making out pay check, a social security record and an employee receipt, or statement of earnings.

A further object is to provide, in a combined article of this type, means for indicating on each element thereof, simultaneously and accurately, the gross wages of the employee, an itemized statement of deductions from the gross wages, and the net wages due the employee.

A further object of the invention is to combine additional elements with the pay roll record sheet in such a manner that it is substantially impossible for one employee to be paid off on the basis of work done by another employee.

A further object of the invention is to combine in a single article a pay roll record, social security tax record, employee receipt, and pay check in such a manner that the elements are integrally secured together and handled as a unit while the entries of work done are being made in the shop or factory department, without, however, subjecting the pay check to the likelihood of becoming soiled or mutilated by handling. Another object of the invention is to provide a structure whereby the combined article, at the end of a pay period, may be sent to the pay roll clerk for calculation of the wages due the employee, from the entries made in the plant by the timekeeper or department head; and to provide a structure, whereby, after these calculations have been made the elements of the article may be shifted, to bring the previously concealed pay check to an uppermost position, so that the final entries on pay roll clerk's record sheet may be copied directly onto the attached pay check and simultaneously manifolded onto the social security record and the employee's receipt.

By virtue of a unique relationship between the printed indicia and the physical characteristics of the article of the present invention, a plurality of new functions may be performed, resulting in many new and unexpected advantages and making possible the use of an entirely new and simplified system of keeping pay roll and similar records. The invention consists not merely in the arrangement of printed matter on a piece of paper, but comprises a novel combination and cooperative relationship between the physical structure and the printed matter so that, in the use of the article, one cooperates with and depends upon the other in the performance of new functions, resulting in great savings of time and effort in keeping pay roll records and substantially entirely eliminating the likelihood of error in making out the pay checks.

In the accompanying drawings, a specific embodiment of the invention is shown for purposes of illustration, but it must be understood that the invention is not limited to the exact arrangement of indicia shown therein and described below, as the indicia may be changed to suit varying conditions in different establishments, and all such changes as come within the scope of the appended claims and their equivalents are comprehended by the invention.

In the drawings:

Figure 1 is a plan view of the article of the present invention, unfolded and laid out flat, with its front face up.

Figure 2 is a fragmentary view of the article of Figure 1, turned over, showing the back face of the two lowermost sections of the article of Figure 1.

Figure 3 is a plan and partial perspective view, on a reduced scale, showing a preferred manner of folding the article for use in the shop or department, while the entries of the work done by the employee are being made from day to day.

Figure 4 is a similar view, showing the manner of folding the sections of the article when the final entries are copied, as by typewriting, onto the pay check and the underlying sections.

In the embodiment of the invention illustrated in the drawings, the article comprises a vertically elongated sheet divided into four sections 10, 11, 12, 13, joined together on transverse, horizontally extending, weakened lines 14, 15, 16, provided by scoring or perforating the elongated sheet. The section 10 is preferably of greater vertical length between its upper edge 17 and the weakened line 14, than the sections 11 and 12, defined by their marginal score lines. The section 13 is preferably, but not necessarily, of slightly less length, between its upper edge 16 and its lower edge 18, than the intermediate sections 11, 12, to facilitate in folding of the section 13 as hereinafter explained and as shown in Figure 3.

The upper section 10 has printed thereon appropriate indicia including the name 20 of the company, and indicia and blank spaces for the employee's department 21, and the date of ending 22 and the number 23 of the pay period.

On the next line therebelow, spaces 24, 25, 26 and 27 are provided, beneath the printed designations of the occupation, social security number, and number and name of the particular employee for whom the record is intended. Below the foregoing data, there are a plurality of spaces 28, 29, 30 for the first, second and third shifts in the plant and for the first and second weeks of the pay period, the spaces being arranged for the days of the week and being of sufficient size to enter the hours of work for each day in each week, both at regular time and overtime.

Many employees are paid on the basis of piece work instead of at an hourly rate, and the invention provides a plurality of spaces 31, 32, 33 and 34 for entering the amount of work done on this basis and the rate of pay therefor. Other spaces are provided for the entry of job numbers, bonus amounts due and the like. Since the invention is not limited to the specific information printed on the pay roll record, these items need not be described in detail, as different employers will adopt different forms, to satisfy the particular conditions in their plants.

As stated above, one article of the present invention for each employee is kept by the shop or department head and an entry of work done by him is made in the spaces 28—34, day to day. At the end of the pay period, all of the records are sent to the pay roll office and the total hours are entered in the spaces 38. The hourly rate is entered in spaces 39 and the amounts earned in spaces 40, the latter being totaled in a space 41, representing the gross wages of the employee for the period in question.

The pay roll clerk enters, in spaces 42, the deductions from the employee's wages, such as for social security tax, lights, rents, notes, advances, accounts, insurance and pay roll tax, if any. The total deductions are entered in a space 43, and the net amount due is entered in space 44 (item 43 substracted from item 41.)

Thus, all of the pertinent data relative to a particular employee for the pay period in question appear conveniently and compactly upon a single sheet, and the manner of arriving at the final sum due to the employee is immediately apparent.

The section 11, secured to the larger section 10 by the perforated line 14, constitutes a social security record, as indicated by the printing 47. This sheet has spaces corresponding to those on the sheet 10 for the number and ending date of the pay period, the employee's name and his social security number. Also, it has a horizontal row of spaces 48—59 for the entry, respectively, of the hours of work, the total wages earned, deductions for social security, lights, rents, notes, advances, accounts, insurance, pay roll tax, total deductions and the balance due, or net wages.

Section 12 is an employee's receipt, attached integrally to the social security record 11 by the weakened line 15. As shown in Figures 1 and 2, this section has a plain face, except that a strip of carbon or other manifolding material 61 may be coated thereon, for the purposes described below.

Figure 2 shows the lower end of the article of Figure 1, turned over about one vertical longitudinal edge as an axis. It will be noted that section 12 has printed on its undersurface, a space 62 for the employee's name and other spaces 63, 64 for the date of ending and number of the pay period. Similarly, it has a horizontal row of spaces 48a—59a, corresponding to the spaces 48—59 on the social security record and in registered superimposed relation with respect thereto when folded as hereinafter explained. The receipt may also have printed thereon an explanatory message 65 or the like, directed to the employee.

The sections 13 attached to the lowermost edge 16 of the employee's receipt is the pay check. On its front face, it has a space 66 for the name of the employee and other blanks 67 and 68 to identify the pay period. Moreover, it is provided with spaces 48b—59b for the entry of the information described above in connection with spaces 48—59 and 48a—59a. The check bears the name of the employer and, at 69, the bank through which payment will be made. Also, it has the usual check signature line 70 upon which an official of the company will sign for the employer.

As indicated in Figure 3, when the article of the present invention is being used in the shop or department of a manufacturing concern or the like, for the posting of entries thereon by the timekeeper or department head, section 11 is folded behind section 10, back to back. Section 12 is folded downwardly, behind section 11 and section 13, the pay check, is folded upwardly in the space between sections 11 and 12, whereby it is protected from being soiled by handling in the plant. A plurality of articles, folded as indicated in Figure 3, may conveniently be stacked in a filing drawer or the like and removed individually for the daily posting of entries, without unfolding the sections 11, 12 and 13, or otherwise changing their position.

After the final entries have been made on the sheets by the timekeeper or department head, at the end of a pay period, he sends the records to the pay roll clerk who calculates the totals and makes his entries in the spaces 38—44. The sections 11, 12 and 13 are then refolded, as indicated in Figure 4, with the section 11 extending downwardly in the same plane as the section 10, the employee receipt 12 folded upwardly above section 11, and the pay check 13 folded downwardly in superimposed relation to the other section, as the uppermost of the three. When in this position, the sets of blank spaces 48—59, 48a—59a, and 48b—59b are in superimposed, registered relation. If desired, the back of the pay check 13 may have a strip 75 of manifolding material thereon, in registration with the blank spaces 48b—59b, but in many cases, it is preferred to insert a separate piece of carbon paper between the check 13 and the employee's receipt 12, since a strip of carbon on the back of a check is sometimes objectionable to persons in banks and clearing houses who must handle the checks.

The articles, folded as indicated in Figure 4, are given by the pay roll clerk to a typist, who threads them individually into a typewriter, with the line of the spaces 48b—59b in alignment with the type bars. In this position, the section 10 is clearly visible above the typewriter roll, so that the figures appearing in spaces 38—44 can be copied directly into the spaces 48b—59b and simultaneously manifolded upon the corresponding spaces on sections 12 and 11. Thus, the employee's pay check, social security record and receipt are simultaneously made out, by copying from an attached sheet, directly in the line of vision of the typist. Hence, the likelihood of error is extremely remote.

In some cases, the typist also copies the name, social security number and employee number and other data from the sheet 10, but it is preferred to have this information over-printed upon the forms by a printer. In other words, the employer purchases or has printed a large number of pay roll sheets with the spaces for the name and number, etc. of the employee left blanks. These sheets are delivered to a printer with a list of employees, giving their names, social security numbers, identification numbers, occupations and departments. The printer overprints a half year's supply of forms for each employee, so that each section of each form shows his department, occupation, social security number, employment number and name. If desired, more or less information can be omitted in the printing of one or another of these sections, since, for instance, some employees object to having their social security numbers printed on documents subject to wide circulation like pay checks.

If this information is over-printed onto the printed forms, there is substantially no possibility that a name or number will be incorrectly copied by the typist and the typist need only copy the figures placed upon the sheets 10 by the pay roll clerk. Since all of the sections are integrally attached, there is no chance that the amount due one employee will be typed onto a check intended for another one. This feature is of major importance, since it eliminates a serious possibility of error.

After the check, receipt and social security record have been filled out, the checks are signed by an official or a check signing machine and the check and employee receipt given to the employee. The sheets 10 are filed in the main office, for permanent record and the social security slips 11 are kept in a separate alphabetical file, for use in making unemployment, social security, State and Federal reports.

Thus, the present invention entirely eliminates the large ledger sheets conventionally used for pay roll purposes and simplifies the keeping of records relating to hours of work, wages, taxes and the like.

As a result of the novel combination of structural features and printed matter, a new system of keeping pay roll records is made possible and the likelihood of error in making out pay checks, employees' receipts, social security records and the like is substantially eliminated.

In the accompanying claims, the terms "vertical" and "horizontal" have been used in the same sense as above, i. e. to indicate lines extending from the upper edge to the lower edge and from one side edge to the other, respectively.

As stated above, the invention is not limited to the details of the arrangement of the printed matter shown in the accompanying drawings and described above, but covers all modifications coming within the scope of the appended claims and their equivalents.

I claim:

1. An employee payroll record comprising a vertically elongated rectangular sheet divided into a plurality of sections interconnected along horizontal, parallel weakened lines extending transversely across the sheet, the section at one end of the sheet being of greater vertical length than the others and having printed thereon, indicia and appropriately designated spaces for the entry by a timekeeper or department head, of the amount and character of work done by a designated employee at regular intervals as the work is done, and having additional indicia and appropriately designated spaces for the entry, at the end of a pay period by a payroll clerk, or the like, of the total wages earned for the work entered in the first-mentioned spaces, taxes and other amounts deducted from said total wages, and the net wages due the employee, the other sections being foldable upon themselves and comprising a pay check, an employee's receipt and a supplemental record, said sections having indicia and appropriately designated spaces printed thereon in registry when the sections are folded upon themselves, whereby data may be copied directly from the entries on the attached first section which are visible to the copyist and entered in the spaces in the uppermost of the last-mentioned sections and simultaneously manifolded in the registered spaces of the sections therebelow.

2. An employee payroll record comprising a vertically elongated rectangular sheet divided into a plurality of sections interconnected along horizontal parallel weakened lines extending transversely of the sheet, the section at one end of the sheet being of greater vertical length than the others and having printed thereon, indicia and approximately designated spaces for the entry by a timekeeper or department head, of the amount and character of work done by a designated employee at regular intervals as the work is done, and having additional indicia and appropriately designated spaces for the entry, at the end of a pay period by a payroll clerk, or the like, of the total wages earned for the work entered in the first-mentioned spaces, taxes and other amounts deducted from said total wages, and the net wages due the employee, the other sections being foldable upon themselves and foldable behind the first section out of the way during handling of the sheet and the making of the above-mentioned entries, and comprising a pay check, an employee's receipt and a supplemental record, said sections having indicia and appropriately designated spaces printed thereon in registry when the sections are folded upon themselves, whereby data may be copied directly from the entries on the attached first section which are visible to the copyist and entered in the spaces in the uppermost of the last-mentioned sections and simultaneously manifolded in the registered spaces of the sections therebelow.

3. An employee payroll record comprising a vertically elongated sheet divided into a plurality of sections interconnected along horizontal parallel weakened lines extending transversely across the sheet, the sections at one end of the sheet being of greater vertical length than the others and having printed thereon, indicia and appropriately designated spaces for the entry by a timekeeper or department head, of the amount and character of work done by a designated employee at regular intervals as the work is done, and having additional indicia and appropriately designated spaces for the entry, at the end of a pay period by a payroll clerk or the like, of the total wages earned for the work entered in the first-mentioned spaces, taxes and other amounts deducted from said total wages, and the net wages due the employee, the section at the other end of the sheet being of less length than all of the others and being foldable inwardly between the intermediate sections and behind the first section and out of the way during handling of the sheet and the making of the above mentioned entries, the last mentioned sections comprising a pay check, an employee's statement of earnings, and a social security record, said sections having indicia and appropriately designated spaces printed thereon in registry when they are folded forwardly and positioned in alignment below the first section, whereby data may be copied directly from the entries on the attached first section which are visible to the typist and entered in the spaces in the uppermost of the last mentioned sections and simultaneously manifolded in the registered spaces of the sections therebelow.

4. A combined payroll record, pay check and employee's receipt, comprising a vertically elongated sheet divided into a plurality of sections interconnected along horizontal parallel weakened lines extending transversely across the sheet, the section at the upper end of the sheet having indicia thereon designating the employee by name, occupation, department of employ, social security number, and the like, and indicia and appropriately designated spaces for the entry from day to day of the amount of his work and additional indicia and appropriately designated spaces for the entry at the end of a pay period of totals of work, wages earned, deductions and net wages due, the other sections, comprising the pay check and employee's receipt, being foldable upon themselves and having indicia and appropriately designated spaces in registry when the sections are folded, whereby said totals on the attached first section are visible to a typist and may be copied directly and typed into the spaces in the pay check and simultaneously manifolded in the spaces in the receipt.

5. A combined payroll record, social security record slip, pay check, and employee's receipt, comprising a vertically elongated sheet divided into four sections interconnected along horizontal parallel weakened lines extending transversely of the sheet, the section at the upper end of the sheet having printed thereon indicia designating the employee by name, occupation, department of employ, social security number, and the like, and indicia and appropriately designated spaces for the entry from day to day of the amount of his work, and additional indicia and appropriately designated spaces for the entry at the end of a pay period of totals of work, wages earned, deductions for social security taxes and other items, and net wages due, the other sections comprising the pay check, the social security record slip, and employee's receipt having printed thereon indicia designating the employee in the same manner as the first section and being foldable upon themselves and having additional indicia and appropriately designated spaces in registry when the sections are folded, whereby said totals are readily visible to a typist and may be copied directly from the attached first section and typed into the spaces in the pay check and simultaneously manifolded in the spaces in the social security record slip and the employee's receipt.

6. A combined payroll record, social security record slip, pay check, and employee's receipt, comprising a vertically elongated sheet divided into a plurality of sections interconnected along horizontal parallel weakened lines extending transversely of the sheet, the section at the upper end of the sheet having on its front face indicia designating the employee and indicia and appropriately designated spaces for the entry from day to day of the amount of his work and additional indicia and appropriately designated spaces for the entry at the end of a pay period of totals of work, wages earned, deductions for social security, and the like, and net wages due, the section attached to the lower end of the first section, comprising the social security record slip, having printed indicia and appropriately designated spaces on the front face thereof corresponding to the last mentioned ones on the first section, the next section, comprising the employee's receipt, having corresponding printed indicia and appropriately designated spaces arranged upside down on its rear face, and the last section, comprising the pay check, having corresponding printed indicia and appropriately designated spaces on its front face in a manner similar to the social security record slips, whereby when the last three sections are folded in zigzag relation upon each other, with the last section uppermost, the blank spaces are in registry and said totals which are visible to a typist may be copied from the first section and, by manifolding, entered simultaneously in the sections therebelow.

ARTHUR J. BRANSCOM.